(12) United States Patent
Dutta et al.

(10) Patent No.: US 12,543,049 B2
(45) Date of Patent: Feb. 3, 2026

(54) AIDED RECEPTION TECHNIQUES FOR SIDELINK COMMUNICATIONS SYSTEMS

(71) Applicant: QUALCOMM Incorporated, San Diego, CA (US)

(72) Inventors: Sourjya Dutta, San Diego, CA (US); Kapil Gulati, Belle Mead, NJ (US); Shuanshuan Wu, San Diego, CA (US); Junyi Li, Fairless Hills, PA (US); Hui Guo, Beijing (CN); Gabi Sarkis, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 504 days.

(21) Appl. No.: 18/006,723

(22) PCT Filed: Sep. 30, 2020

(86) PCT No.: PCT/CN2020/119341
§ 371 (c)(1),
(2) Date: Jan. 24, 2023

(87) PCT Pub. No.: WO2022/067646
PCT Pub. Date: Apr. 7, 2022

(65) Prior Publication Data
US 2023/0269595 A1 Aug. 24, 2023

(51) Int. Cl.
*H04W 16/14* (2009.01)
*H04L 5/00* (2006.01)

(52) U.S. Cl.
CPC .......... *H04W 16/14* (2013.01); *H04L 5/0051* (2013.01); *H04L 5/0053* (2013.01)

(58) Field of Classification Search
None
See application file for complete search history.

(56) References Cited

U.S. PATENT DOCUMENTS 9,854,424 B2 * 12/2017 Kim ................. H04W 48/16
10,181,934 B2 * 1/2019 Chen ................. H04J 11/0056
(Continued)

FOREIGN PATENT DOCUMENTS

CN 107646176 A 1/2018
CN 111106898 A 5/2020
(Continued)

OTHER PUBLICATIONS

Huawei, et al., "Forward Compatibility Consideration on Symmetric Design Across Multiple Links for Unified Duplex", 3GPP TSG RAN WG1 Meeting #86, R1-167220, Gothenburg, Sweden Aug. 22-26, 2016, Aug. 12, 2016, Sections 1-3, pp. 1-3.
(Continued)

*Primary Examiner* — Faiyazkhan Ghafoerkhan
(74) *Attorney, Agent, or Firm* — Holland & Hart LLP

(57) ABSTRACT

Methods, systems, and devices for wireless communications are described. A first user equipment (UE) may receive, at a first transmission reception point, a first transmission from a second UE associated with communications between the second UE and a third UE. The first UE may receive, at a second transmission reception point, a second transmission. The first UE may identify transmissions having overlapping time-frequency resources based on receiving the first transmission and the second transmission. In some examples, the identified transmissions may include the first transmission and the second transmission. Additionally or alternatively, the identified transmissions may include a third transmission and a fourth transmission. The first UE may transmit an interference mitigation signal to the second UE. The interference mitigation signal may include an indication to orthogonalize one or more reference signals, a negative acknowledgment indication, or both.

35 Claims, 11 Drawing Sheets

(56) References Cited

U.S. PATENT DOCUMENTS

| | | | |
|---|---|---|---|
| 10,206,215 B2* | 2/2019 | Kim | H04W 72/51 |
| 10,356,593 B2* | 7/2019 | Kim | H04W 8/005 |
| 11,005,615 B2* | 5/2021 | Li | H04W 52/0216 |
| 2016/0249198 A1* | 8/2016 | Kim | H04W 48/16 |
| 2016/0269887 A1* | 9/2016 | Kim | H04W 76/14 |
| 2016/0381672 A1* | 12/2016 | Kim | H04W 52/283 |
| | | | 370/329 |
| 2019/0274155 A1* | 9/2019 | Bhattad | H04L 5/0073 |
| 2019/0306923 A1* | 10/2019 | Xiong | H04L 27/261 |
| 2020/0145967 A1* | 5/2020 | Park | H04W 72/23 |
| 2020/0187141 A1* | 6/2020 | Lee | H04W 72/0446 |
| 2020/0205165 A1* | 6/2020 | Huang | H04L 5/0051 |
| 2021/0273742 A1* | 9/2021 | Xu | H04L 1/0013 |
| 2021/0298000 A1* | 9/2021 | Park | H04W 72/23 |
| 2021/0321417 A1* | 10/2021 | Kim | H04L 5/0048 |
| 2022/0006501 A1* | 1/2022 | Kim | H04W 24/10 |
| 2022/0159596 A1* | 5/2022 | Kim | H04J 11/00 |
| 2022/0248383 A1* | 8/2022 | Park | H04W 72/27 |
| 2023/0269595 A1* | 8/2023 | Dutta | H04L 5/0053 |
| | | | 370/329 |
| 2023/0353325 A1* | 11/2023 | Dutta | H04B 7/0408 |
| 2024/0313885 A1* | 9/2024 | Xu | H04L 5/0048 |
| 2025/0063573 A1* | 2/2025 | Park | H04L 5/0053 |

FOREIGN PATENT DOCUMENTS

| | | |
|---|---|---|
| CN | 111480370 A | 7/2020 |
| WO | WO-2016191048 | 12/2016 |
| WO | WO-2019103807 | 5/2019 |

OTHER PUBLICATIONS

International Search Report and Written Opinion—PCT/CN2020/119341—ISA/EPO—Jul. 7, 2021.

* cited by examiner

AIDED RECEPTION TECHNIQUES FOR SIDELINK COMMUNICATIONS SYSTEMS

CROSS REFERENCE

The present Application is a 371 national stage filing of International PCT Application No. PCT/CN2020/119341 by Dutta et al. entitled "AIDED RECEPTION TECHNIQUES FOR SIDELINK COMMUNICATIONS SYSTEMS," filed Sep. 30, 2020, which is assigned to the assignee hereof, and which is expressly incorporated by reference in its entirety herein.

FIELD OF TECHNOLOGY

The following relates to wireless communications, including aided reception techniques for sidelink communications systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). Some wireless communications systems may support sidelink communications between UEs. In some cases, transmissions in the system may interfere with each other, which may result in relatively inefficient communications. As an example, a UE may receive a transmission with relatively poor signal quality due to such interference and may fail to decode the transmission.

SUMMARY

The described techniques relate to improved methods, systems, devices, and apparatuses that support aided reception techniques for sidelink communications systems. Generally, the described techniques may enable a user equipment (UE) to implement interference mitigation signaling in a wireless communications system, which may improve communications efficiency and reliability, among other advantages. For example, a first UE may identify transmissions with overlapping resources. In some examples, the transmissions may correspond to other UEs in the system (e.g., the transmissions may be communications intended for UEs other than the first UE). The first UE may determine that the transmissions with overlapping resources may collide, for example, due to each transmission including non-orthogonal reference signals. Accordingly, the first UE may transmit an interference mitigation signal based on identifying the transmissions with overlapping resources. For example, the first UE may transmit a negative acknowledgment indication, an indication to orthogonalize one or more reference signals for a subsequent transmissions, or a combination thereof to one or more UEs associated with the identified transmissions. Such techniques may enable the UEs in the system to improve communications reliability (e.g., the UEs may retransmit data using orthogonal reference signals, which may enable another UE to successfully decode the transmissions), communications efficiency, or both, among other benefits.

A method of wireless communications at a first UE is described. The method may include receiving, at a first transmission reception point of the first UE, a first transmission from a second UE, the first transmission from the second UE associated with sidelink communications between the second UE and a third UE, receiving a second transmission at a second transmission reception point of the first UE, identifying transmissions having overlapping time-frequency resources based on receiving the first transmission and the second transmission, and transmitting, to the second UE, an interference mitigation signal associated with the identified transmissions having the overlapping time-frequency resources.

An apparatus for wireless communications at a first UE is described. The apparatus may include a processor, memory coupled with the processor, and instructions stored in the memory. The instructions may be executable by the processor to cause the apparatus to receive, at a first transmission reception point of the first UE, a first transmission from a second UE, the first transmission from the second UE associated with sidelink communications between the second UE and a third UE, receive a second transmission at a second transmission reception point of the first UE, identify transmissions having overlapping time-frequency resources based on receiving the first transmission and the second transmission, and transmit, to the second UE, an interference mitigation signal associated with the identified transmissions having the overlapping time-frequency resources.

Another apparatus for wireless communications at a first UE is described. The apparatus may include means for receiving, at a first transmission reception point of the first UE, a first transmission from a second UE, the first transmission from the second UE associated with sidelink communications between the second UE and a third UE, receiving a second transmission at a second transmission reception point of the first UE, identifying transmissions having overlapping time-frequency resources based on receiving the first transmission and the second transmission, and transmitting, to the second UE, an interference mitigation signal associated with the identified transmissions having the overlapping time-frequency resources.

A non-transitory computer-readable medium storing code for wireless communications at a first UE is described. The code may include instructions executable by a processor to receive, at a first transmission reception point of the first UE, a first transmission from a second UE, the first transmission from the second UE associated with sidelink communications between the second UE and a third UE, receive a second transmission at a second transmission reception point of the first UE, identify transmissions having overlapping time-frequency resources based on receiving the first transmission and the second transmission, and transmit, to the second UE, an interference mitigation signal associated with the identified transmissions having the overlapping time-frequency resources.

In some examples of the method, apparatuses, and non-transitory computer-readable medium described herein, transmitting the interference mitigation signal may include operations, features, means, or instructions for transmitting an indication to orthogonalize one or more reference signals for the sidelink communications between the second UE and the third UE.

In some examples of the method, apparatuses, and non-transitory computer-readable medium described herein, transmitting the interference mitigation signal may include operations, features, means, or instructions for transmitting a negative acknowledgment indication and an indication to orthogonalize one or more reference signals for the sidelink communications between the second UE and the third UE.

Some examples of the method, apparatuses, and non-transitory computer-readable medium described herein may further include operations, features, means, or instructions for transmitting, to one or more UEs associated with the identified transmissions having overlapping time-frequency resources, a second interference mitigation signal that includes a second negative acknowledgment indication.

In some examples of the method, apparatuses, and non-transitory computer-readable medium described herein, the identified transmissions having overlapping time-frequency resources include a third transmission indicated by the first transmission and a fourth transmission indicated by the second transmission.

In some examples of the method, apparatuses, and non-transitory computer-readable medium described herein, the interference mitigation signal includes a first bit for the negative acknowledgment indication and one or more bits for the indication to orthogonalize one or more reference signals.

In some examples of the method, apparatuses, and non-transitory computer-readable medium described herein, transmitting the interference mitigation signal may include operations, features, means, or instructions for transmitting a negative acknowledgment indication.

In some examples of the method, apparatuses, and non-transitory computer-readable medium described herein, the first transmission indicates a third transmission with a first set of time-frequency resources different from a second set of time-frequency resources for a fourth transmission indicated by the second transmission.

Some examples of the method, apparatuses, and non-transitory computer-readable medium described herein may further include operations, features, means, or instructions for storing reference signal information associated with the first transmission and the second transmission, and identifying a third transmission indicated by the first transmission and a fourth transmission indicated by the second transmission, where the identified transmissions having overlapping time-frequency resources include the third transmission and the fourth transmission.

In some examples of the method, apparatuses, and non-transitory computer-readable medium described herein, the first transmission was received subsequent to the second transmission, and where transmitting the interference mitigation signal to the second UE may be based on the first transmission being received subsequent to the second transmission.

Some examples of the method, apparatuses, and non-transitory computer-readable medium described herein may further include operations, features, means, or instructions for transmitting the interference mitigation signal via a physical sidelink feedback channel.

Some examples of the method, apparatuses, and non-transitory computer-readable medium described herein may further include operations, features, means, or instructions for transmitting the interference mitigation signal via a dedicated channel.

Some examples of the method, apparatuses, and non-transitory computer-readable medium described herein may further include operations, features, means, or instructions for decoding the first transmission and the second transmission, and determining that the identified transmissions having overlapping time-frequency resources may be associated with non-orthogonal reference signals based on the decoding, where transmitting the interference mitigation signal may be based on the transmissions being associated with the non-orthogonal reference signals.

In some examples of the method, apparatuses, and non-transitory computer-readable medium described herein, the non-orthogonal reference signals include demodulation reference signal sequences, channel state information reference signal sequences, interference management resource signals, or any combination thereof.

In some examples of the method, apparatuses, and non-transitory computer-readable medium described herein, the identified transmissions having overlapping time-frequency resources include the first transmission and the second transmission.

In some examples of the method, apparatuses, and non-transitory computer-readable medium described herein, the identified transmissions having overlapping time-frequency resources include a third transmission indicated by the first transmission and a fourth transmission indicated by the second transmission.

A method of wireless communications at a first UE is described. The method may include transmitting a first transmission to a second UE, the first transmission associated with sidelink communications between the first UE and the second UE, where the first transmission includes a first reference signal, receiving, based on transmitting the first transmission, an interference mitigation signal including an indication to orthogonalize a second reference signal of a second transmission, and transmitting, to the second UE, the second transmission having the orthogonalized second reference signal based on the received indication.

An apparatus for wireless communications at a first UE is described. The apparatus may include a processor, memory coupled with the processor, and instructions stored in the memory. The instructions may be executable by the processor to cause the apparatus to transmit a first transmission to a second UE, the first transmission associated with sidelink communications between the first UE and the second UE, where the first transmission includes a first reference signal, receive, based on transmitting the first transmission, an interference mitigation signal including an indication to orthogonalize a second reference signal of a second transmission, and transmit, to the second UE, the second transmission having the orthogonalized second reference signal based on the received indication.

Another apparatus for wireless communications at a first UE is described. The apparatus may include means for transmitting a first transmission to a second UE, the first transmission associated with sidelink communications between the first UE and the second UE, where the first transmission includes a first reference signal, receiving, based on transmitting the first transmission, an interference mitigation signal including an indication to orthogonalize a second reference signal of a second transmission, and transmitting, to the second UE, the second transmission having the orthogonalized second reference signal based on the received indication.

A non-transitory computer-readable medium storing code for wireless communications at a first UE is described. The code may include instructions executable by a processor to transmit a first transmission to a second UE, the first transmission associated with sidelink communications between the first UE and the second UE, where the first transmission includes a first reference signal, receive, based on transmitting the first transmission, an interference mitigation signal including an indication to orthogonalize a second reference signal of a second transmission, and transmit, to the second UE, the second transmission having the orthogonalized second reference signal based on the received indication.

In some examples of the method, apparatuses, and non-transitory computer-readable medium described herein, receiving the interference mitigation signal may include operations, features, means, or instructions for receiving a negative acknowledgment indication.

In some examples of the method, apparatuses, and non-transitory computer-readable medium described herein, the interference mitigation signal includes a first bit for the negative acknowledgment indication and one or more bits for the indication to orthogonalize the second reference signal.

Some examples of the method, apparatuses, and non-transitory computer-readable medium described herein may further include operations, features, means, or instructions for receiving the interference mitigation signal via a physical sidelink feedback channel.

Some examples of the method, apparatuses, and non-transitory computer-readable medium described herein may further include operations, features, means, or instructions for receiving the interference mitigation signal via a dedicated channel.

In some examples of the method, apparatuses, and non-transitory computer-readable medium described herein, the first reference signal, the second reference signal, or both include demodulation reference signal sequences, channel state information reference signal sequences, interference management resource signals, or any combination thereof.

DETAILED DESCRIPTION

Figure 1:
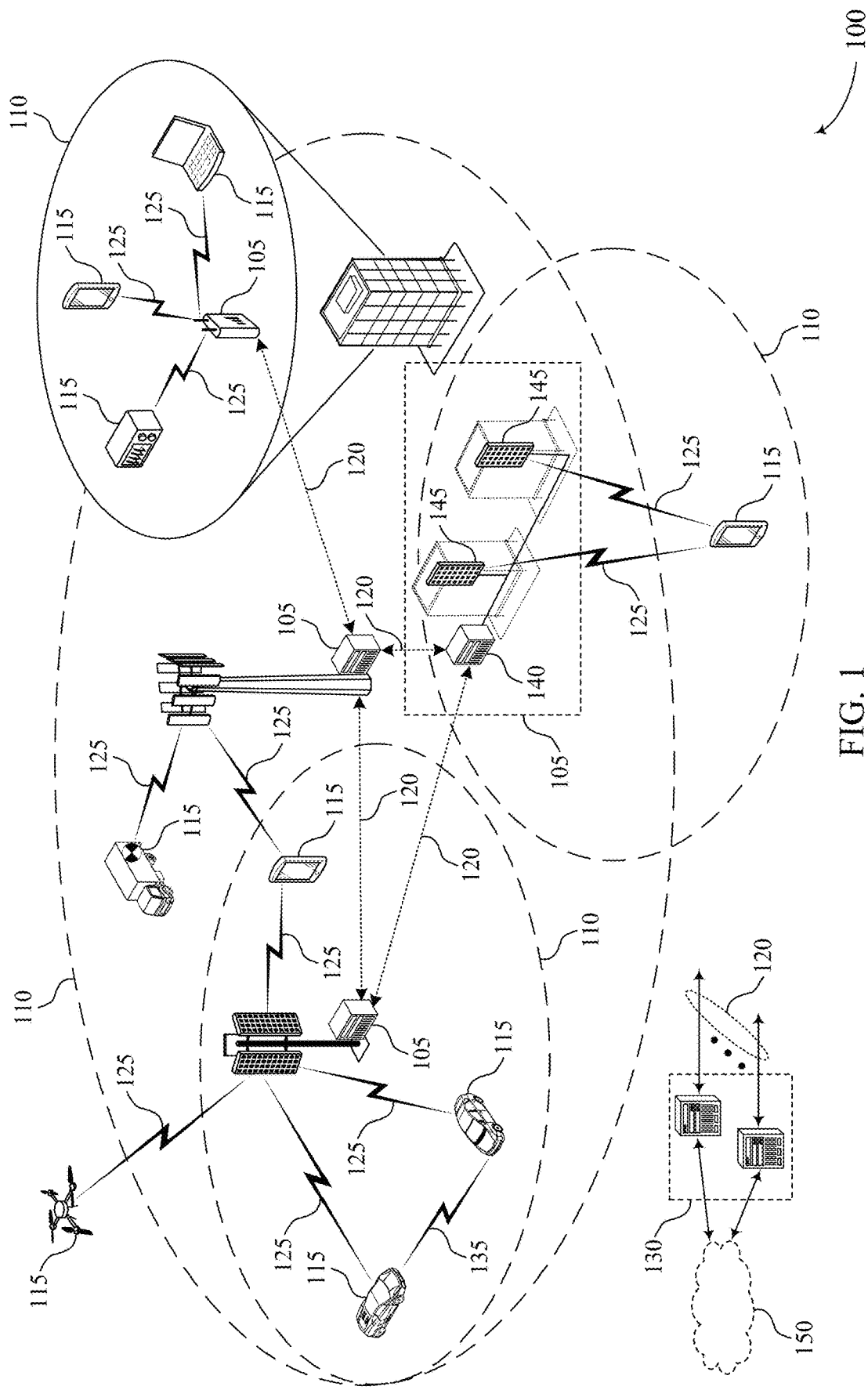
FIG. 1 illustrates an example of a system for wireless communications that supports aided reception techniques for sidelink communications systems in accordance with aspects of the present disclosure.

Some wireless communications systems, such as fifth generation (5G) systems which may be referred to as New Radio (NR) systems, may support sidelink communications. A sidelink may refer to a communication link between similar devices, such as user equipment (UE), relay, or end devices, among other examples of devices. For example, a sidelink may support communications between multiple UEs (e.g., in a vehicle-to-everything (V2X) system, a vehicle-to-vehicle (V2V) system, a device-to-device (D2D) system, among other examples), between multiple base stations (e.g., in an integrated access and backhaul (IAB) deployment), or between other types of wireless communications devices. It is noted that while various examples provided herein are discussed for UE sidelink devices, such sidelink techniques may be used for any type of wireless devices that use sidelink communications. For example, a sidelink may support one or more of D2D communications, V2X or V2V communications, message relaying, discovery signaling, beacon signaling, or other signals transmitted over-the-air from one wireless device to one or more other similar wireless devices.

In some cases, communications in the system may result in interference. For example, multiple UEs may send transmissions via overlapping time frequency resources, which may result in collisions between the transmissions and reduced signal quality for communications. As an illustrative example, UEs may send overlapping transmissions to a target UE. The target UE may be unable to successfully decode the transmissions. For example, the transmissions may include non-orthogonal reference signals or interference management resources (IMR), which may result in relatively poor channel estimation at the target UE (e.g., a noisy channel may lead to improper equalization and decoding failure).

In accordance with the techniques described herein, a first UE may be enabled to perform interference management for other UEs in the system. In some examples, the first UE may be an example of a multiple transmission reception point (TRP) UE, which may enable the first UE to decode transmissions with overlapping resources. For example, the first UE may successfully decode the transmissions due to improved spatial diversity associated with processing received signals using multiple panels (e.g., the first UE may decode transmissions with non-orthogonal reference signals using multiple TRPs). Accordingly, the first UE may perform interference management operations for other UEs in the system.

For example, the first UE (e.g., the multi-TRP UE) may receive transmissions from at least a second UE and a third UE. In some examples, the transmissions may be intended for UEs different than the first UE. For example, the transmissions may be intended for a fourth UE (e.g., a target UE)

in a group of UEs including the second UE and the third UE. The first UE may identify transmissions having overlapping time-frequency resources (e.g., communications over overlapping frequency resources, overlapping time resources, communications using non-orthogonal reference signals or IMR, etc.). For example, the first UE may determine that the received transmissions are colliding, that subsequent communications indicated by the received transmissions may have overlapping resources and/or non-orthogonal reference signals, or both. The first UE may transmit an interference mitigation signal to one or more UEs. The interference mitigation signal may trigger one or more actions at one or more of the other transmitting UEs that result in reduced interference at the target UE. For example, the first UE may transmit a negative acknowledgment (NAK) indication, an indication to orthogonalize one or more reference signals for sidelink communications between UEs, or a combination thereof. Such interference mitigation signals may enable a transmitting UE (e.g., the second UE and/or the third UE) to retransmit communications (e.g., on non-overlapping resources) that may be successfully received by the fourth UE, to transmit current or subsequent communications using orthogonalized signals, or a combination thereof, which may enable a fourth UE to successfully decode the communications, among other advantages as described herein.

Aspects of the disclosure are initially described in the context of wireless communications systems. Aspects of the disclosure are then described in the context of process flows. Aspects of the disclosure are further illustrated by and described with reference to apparatus diagrams, system diagrams, and flowcharts that relate to aided reception techniques for sidelink communications systems.

FIG. 1 illustrates an example of a wireless communications system 100 that supports aided reception techniques for sidelink communications systems in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some examples, the wireless communications system 100 may support sidelink communications (e.g., communications within a group of UEs 115). For example, the wireless communications system 100 may be an example of, or include aspects of, a V2X communications system (e.g., a UE 115 may be an example of a vehicle, a vulnerable road user (VRU), or other wireless devices). In some examples, a UE 115 may include one or more TRPs. For example, a UE 115 may be an example of a vehicle with a single TRP or a UE 115 may be an example of a vehicle with multiple TRPs (e.g., two TRPs located at the front and the rear of the vehicle, although any quantity or location of TRPs may be used).

In accordance with the techniques described herein, the wireless communications system 100 may implement aided reception techniques for sidelink communications. For example, a UE 115 may be an example of a multiple TRP (mTRP) UE and may use the multiple TRPs to perform interference mitigation signaling for other UEs 115 in the system (e.g., the mTRP UE 115 may have a relatively higher capability for decoding transmissions using multiple TRPs due to improved spatial diversity). A mTRP UE 115 may identify transmissions with overlapping resources. In some examples, the transmissions may correspond to other UEs 115 in the system (e.g., the transmissions may be communications intended for UEs 115 other than a mTRP UE 115). The mTRP UE 115 may determine that the transmissions with overlapping resources may collide, for example, due to each transmission including non-orthogonal reference signals. Accordingly, the mTRP UE 115 may transmit an interference mitigation signal based on identifying the transmissions with overlapping resources. For example, the mTRP UE 115 may transmit a NAK indication, an indication to orthogonalize one or more reference signals for a subsequent transmissions, or a combination thereof to one or more UEs 115 associated with the identified transmissions. Such techniques may enable the UEs 115 in the system to improve communications reliability (e.g., the UEs 115 may retransmit data using orthogonal reference signals, which may enable another UE 115 to successfully decode the transmissions), communications efficiency, or both, among other examples of benefits.

Figure 2:
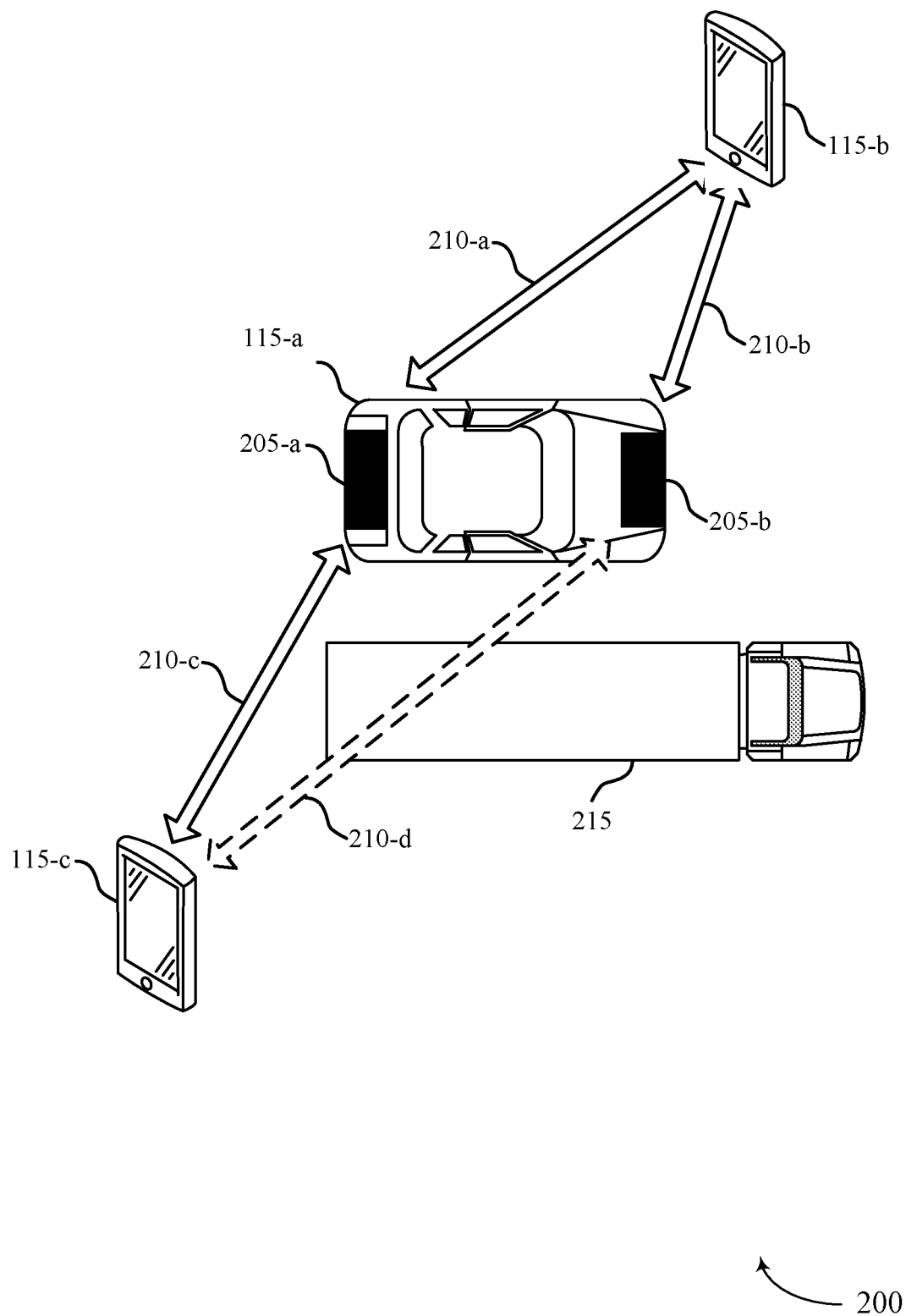
FIG. 2 illustrates an example of a wireless communications system that supports aided reception techniques for sidelink communications systems in accordance with aspects of the present disclosure.

FIG. 2 illustrates an example of a wireless communications system 200 that supports aided reception techniques for sidelink communications systems in accordance with aspects of the present disclosure. In some examples, the wireless communications system 200 may implement aspects of wireless communications system 100. For example, the wireless communications system 200 may include a UE 115-*a*, a UE 115-*b*, and a UE 115-*c*, which may be examples of UEs 115 as described with reference to FIG. 1. For example, the UEs 115 may be examples of wireless devices (e.g., vehicles, mobile devices, VRUs, etc.).

In some examples, the UE 115-*a* may be an example of a multi-TRP UE 115. As an illustrative example, the UE 115-*a* may include a first TRP 205-*a* and a second TRP 205-*b*, although it is to be understood that any quantity of TRPs 205 may be implemented by a UE 115 (e.g., a larger vehicle such as a truck or trailer may have relatively more TRPs 205). Each of the TRPs 205-*a* and 205-*b* may be configured to receive and transmit signals. The TRPs 205-*a* and 205-*b* may be configured to transmit signals in conjunction with one another, individually (e.g., separately from one another), or both.

Such TRPs 205 may include, but are not limited to, antennas, antenna panels, and the like. For example, the TRPs 205-*a* and 205-*b* may include different radio frequency modules with shared hardware and/or software controller. For instance, in a first multi-TRP UE 115, a first TRP and a second TRP may exhibit separate radio frequency (RF) modules and separate baseband components, but may share common processing in the physical layer, MAC layer, RLC layer, PDCP layer, RRC layer, or any combination thereof. By way of another example, in a second multi-TRP UE 115, a first TRP and a second TRP may exhibit separate RF modules, separate baseband components, and separate processing in the physical layer, MAC layer, RLC layer, PDCP layer, or any combination thereof, such that the first TRP and the second TRP share common processing resources in the RRC layer.

In some cases, the TRPs 205 of the UE 115-*a* may be positioned relatively close to one another. In other cases, the TRPs 205 of the UE 115-*a* may be physically separated from each other by some distance. For example, in the context of a vehicle, the first TRP 205-*a* may be positioned at or near the rear of the vehicle, and the second TRP 205-*b* may be positioned at or near the front of the vehicle. In this example, the first TRP 205-*a* (e.g., first antenna panel) and the second TRP 205-*b* (e.g., second antenna panel) may be separated from one another by several meters. This physical separation may be even larger in the case of larger UEs 115, such as semi-trucks, where multiple TRPs 205 may be physically separated from one another by twenty meters or more, although the TRPs 205 may be located an distance from each other.

Due to the separate components, physical position, and physical separation between the first TRP 205-*a* and the second TRP 205-*b*, each of the respective TRPs 205 may view a channel differently. For example, the first TRP 205-*a* may receive signals from the UE 115-*b* via a communications link 210-*a*, and the second TRP 205-*b* may receive signals from the UE 115-*b* via communications link 210-*b*. In this example, the signals received at the first TRP 205-*a* may travel a greater distance than the signals received at the second TRP 205-*b*. The varying propagation distances may result in varying parameters (e.g., characteristics) associated with the signals received by the respective TRPs 205. For instance, due to the differences in propagation distances, the signals received at the first TRP 205-*a* may exhibit a lower signal quality (e.g., lower received signal strength indicator (RSSI), lower reference signal received power (RSRP), lower reference signal received quality (RSRQ), higher SNR, higher SINR) as compared to the signals received at the second TRP 205-*b*. Moreover, the signals received at the first TRP 205-*a* may be received later in time than the signals received at the second TRP 205-*b*. These differences in signal parameters (e.g., RSRP, RSRQ, SNR, SINR, time of receipt) may result despite the fact that the respective signals were transmitted by the UE 115-*b* at the same time and with the same transmit power.

Physical obstructions, weather conditions, noise, line of sight (LoS) vs. non-line of sight (NLoS), and other conditions may further increase differences between signals transmitted and/or received by the respective TRPs 205. For example, the UE 115-*c* may transmit signals to the first TRP 205-*a* via a communications link 210-*c*, and may transmit signals to the second TRP 205-*b* b via a communications link 210-*d*. In this example, the signals may be effectively received by the first TRP 205-*a*. However, the signals transmitted to the second TRP 205-*b* may be deflected, blocked, or otherwise interfered with by an obstruction 215, such as a truck. In this example, the signals may not be received from the UE 115-*c* at the second TRP 205-*b* due to the obstruction 215. Additionally or alternatively, signals which are received at the second TRP 205-*b* may suffer from low signal quality as compared to the signals received by the first TRP 205-*a*.

Additionally or alternatively, communications in the wireless communications system 200 may result in interference. For example, multiple UEs 115 may send transmissions via overlapping time frequency resources, which may result in collisions between the transmissions and reduced signal quality for communications. As an illustrative example, UEs 115-*b* and 115-*c* may send overlapping transmissions to a target UE 115 (not shown). The target UE 115 may be unable to successfully decode the transmissions. For example, the transmissions may include non-orthogonal reference signals (e.g., demodulation reference signals (DMRSs), channel state information (CSI) reference signal (RS), etc.) or may use the same interference management resources, which may result in relatively poor channel estimation (e.g., a noisy channel may lead to improper equalization and decoding failure at the target UE 115).

In accordance with the techniques described herein, the UE 115-*a* may be enabled to perform interference management for other UEs 115 in the system. For example, the UE 115-*a* may be an mTRP UE 115, which may enable the UE 115-*a* to successfully decode packets of the transmissions with overlapping resources, non-orthogonal RSs, or both even if the target UE 115 is unable to successfully receive or decode the transmissions (e.g., the target UE 115 may be a single TRP UE 115). In other words, the UE 115-*a* may use the first TRP 205-*a* and the second TRP 205-*b* to receive communications from multiple UEs 115 on overlapping resources using spatial division multiplexing techniques over the multiple TRPs 205. Accordingly, the techniques described herein may enable the mTRP UE 115-*a* to perform operations to manage interference and/or poor channel conditions in the wireless communications system 200, which may result in improved efficiency and reliability of communications, among other advantages.

For example, the UE 115-*a* may receive transmissions from at least a second UE 115-*b* and a third UE 115-*c*. In some examples, the transmissions may be intended for UEs 115 different than the first UE 115-*a*. For example, the transmissions may be intended for a fourth UE 115 (not shown) in a group of UEs 115 including the second UE 115-*b* and the third UE 115-*d*. The first UE 115-*a* may identify transmissions having overlapping time-frequency resources (e.g., communications over overlapping frequency resources, overlapping time resources, communications using non-orthogonal reference signals, etc.). For example, the first UE 115-*a* may determine that the received transmissions are colliding (e.g., the received transmissions may have overlapping resources and/or non-orthogonal reference signals), that subsequent communications indicated by the received transmissions may collide, or both. The first UE 115-*a* may transmit an interference mitigation signal to one or more UEs 115. For example, the first UE 115-*a* may transmit a NAK indication, an indication to orthogonalize one or more reference signals for sidelink communications between UEs 115, or a combination thereof. Such interference mitigation signals may enable the UE 115-*b* or the UE 115-*c* to retransmit communications based on the NAK, to transmit subsequent communications using orthogonalized signals based on the indication to orthogonalize one or more reference signals, or a combination thereof, which may enable a target UE 115 to successfully decode the communications, among other advantages.

Figure 3:
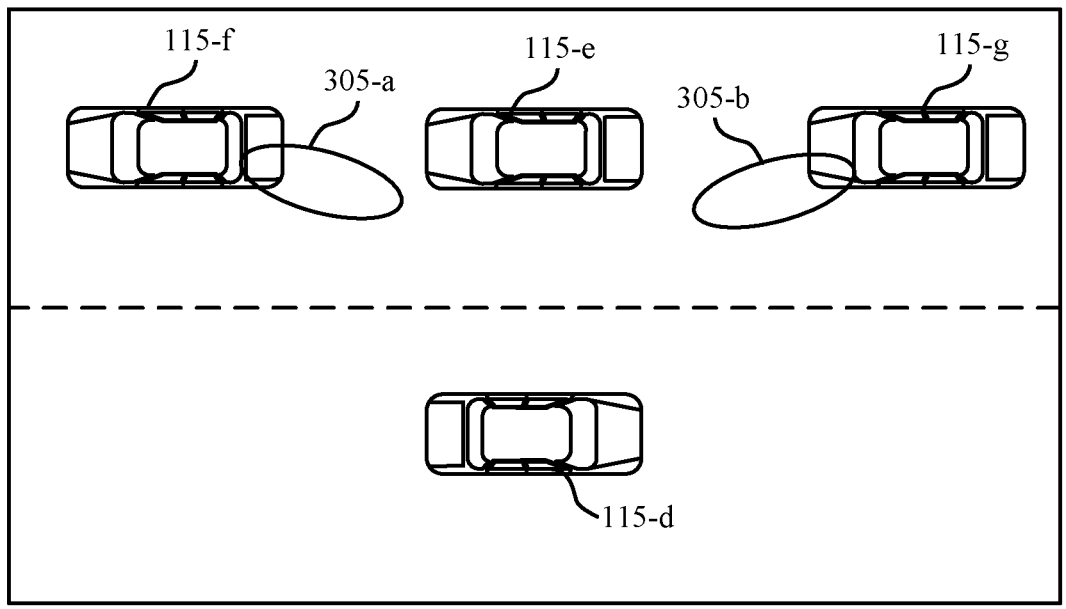
FIG. 3 illustrates an example of a wireless communications system that supports aided reception techniques for sidelink communications systems in accordance with aspects of the present disclosure.

FIG. 3 illustrates an example of a wireless communications system 300 that supports aided reception techniques for sidelink communications systems in accordance with aspects of the present disclosure. In some examples, the wireless communications system 300 may implement aspects of wireless communications system 100 or 200. For example, the wireless communications system 300 may include a UE 115-*d*, a UE 115-*e*, a UE 115-*f*, and a UE 115-*g*, which may be examples of UEs 115 described with reference to FIGS. 1 and 2.

In some examples, the UE 115-*d* may be an example of a multi-TRP UE 115-*d*, as described herein with reference to FIGS. 1 and 2. For example, the UE 115-*d* may include a first TRP and a second TRP different from the first TRP. The TRPs may be configured to transmit or receive signals in conjunction with one another, individually (e.g., separately from one another), or both. The UEs 115 in the wireless communications system 300 may communicate via sidelinks (e.g., sidelink communication links such as a PC5 interface in a V2X system, among other examples).

The UE 115-*d* may be able to receive communications from multiple UEs 115 (e.g., simultaneously) on the same time-frequency resources using the multiple TRPs. For example, the UE 115-*d* may receive a first transmission 305-*a* and a second transmission 305-*b* on the same resources (e.g., IMR resources of a control channel for reserving resources for sidelink communications). The UE 115-*d* may process the transmissions separately or may combine the transmissions intelligently. As an illustrative example, the UE 115-*d* may receive the first transmission 305-*a* using a first TRP, the second transmission 305-*b* using the second TRP, or a combination thereof (e.g., the first TRP may process one or both of the transmissions 305 and the second TRP may process one or both of the transmissions 305). By receiving the first transmission 305-*a* and the second transmission 305-*b* using the multiple TRPs the UE 115-*d* may successfully decode the transmissions (e.g., due to the spatial diversity for receiving the transmissions). In some examples, the UE 115-*d* may be able to detect colliding transmissions or transmissions scheduled to collide (e.g., interfere) on the control channel (e.g., IMR resources for scheduling communications in the system).

In some examples, the UE 115-*d* may determine that the received packets (e.g., carried by the first transmission 305-*a* and/or the second transmission 305-*b*) are not associated with the UE 115-*d*. For example, the UE 115-*d* may not be in the same group as the UE 115-*f*, the UE 115-*e*, and the UE 115-*g* (e.g., the UE 115-*d* may be in a different lane than the other UEs 115). Additionally or alternatively, the packets may correspond to a different application. Additionally or alternatively, the transmissions 305 may be unicast transmissions intended for a UE 115 different than the UE 115-*d* (e.g., the first transmission 305-*a* and the second transmission 305-*b* may be intended for other UEs in the group such as the UE 115-*e*). In such examples, the UE 115-*d* may be referred to as a bystander multi-TRP UE 115.

The UE 115-*d* may perform interference mitigation operations based on such determining and/or a configuration of the UE 115-*d* (e.g., the UE 115-*d* may be configured to manage interference upon detection of an interference event based on the capability of the UE 115-*d* corresponding to multiple TRPs). For example, the UE 115-*d* may detect transmissions may be colliding (e.g., present or future reservations on a control channel may interfere with each other due to using the same time-frequency resources and/or non-orthogonal reference signals). The UE 115-*d* may transmit one or more interference mitigation signals (e.g., a NAK indication, an indication to orthogonalize one or more reference signals, or a combination thereof) to one or more of the UE 115-*f* and the UE 115-*g*, which may reduce the likelihood of interference between future communications from the UE 115-*f* or the UE 115-*g* (e.g., a single TRP UE 115-*e* may be able to successfully decode future transmissions 305 due to the future transmissions using orthogonal reference signals and/or different resources).

In some examples, the UE 115-*d* may determine that two or more received transmissions 305 may be colliding (e.g., interfering). For example, the UE 115-*d* may receive and decode the transmission 305-*a* and the transmission 305-*b*. The UE 115-*d* may determine that the transmission 305-*a* and the transmission 305-*b* are received via the same or at least partially overlapping time-frequency resources. Additionally or alternatively, the UE 115-*d* may determine that the transmission 305-*a* and the transmission 305-*b* include non-orthogonal reference signals (e.g., upon decoding the sidelink control channel carrying the transmissions). For example, the UE 115-*f* and the UE 115-*g* may send the transmissions 305-*a* and 305-*b*, respectively, using non-orthogonal DMRSs, CSI-RSs, IMRs, or any combination thereof. Such examples may indicate that the transmissions 305-*a* and 305-*b* are interfering with each other and the UE 115-*e* may be unable to successfully receive the transmissions 305-*a* and 305-*b* (e.g., due to having a single TRP).

Additionally or alternatively, the UE 115-*d* may identify future transmissions 305 may interfere with each other (e.g., the reserved resources for future transmissions or retransmissions may be scheduled for communications on overlapping resources, may use non-orthogonal reference signals, or both). For example, the UE 115-*d* may identify such communications from the sidelink control information included in the transmissions 305-*a* and 305-*b*. In some examples, transmissions indicated by the transmissions 305-*a* and 305-*b* may be retransmissions of resource reservations (e.g., the transmission 305-*a* may be a reservation message and may indicate a periodicity and/or resources for a retransmission of the transmissions 305-*a*).

The UE 115-*d* may transmit one or more interference mitigation signals based on identifying that the received transmissions 305 may be colliding, that the future transmissions 305 may collide, or both. As one illustrative example, the UE 115-*d* may determine that retransmissions reservations may be non-overlapping (e.g., the transmissions 305-*a* and 305-*b* may or may not be colliding and may indicate different resources for respective retransmissions). In such examples, the UE 115-*d* may transmit a NAK indication to one or both of the colliding UEs 115 (e.g., the UE 115-*f* and/or the UE 115-*g*) to trigger the retransmissions. By aiding reception using the multiple TRPs of the UE 115-*d* (e.g., triggering retransmissions upon detecting interference), the UE 115-*e* may successfully receive the transmissions 305-*a* and 305-*b* at a subsequent time even if the UE 115-*e* fails to decode the initial overlapping transmissions 305-*a* and 305-*b*. In such examples, the UE 115-*e* may not have been able to transmit a NACK indication because it may not have been able to decode the control information for the transmissions 305-*a* and 305-*b*. As such, the UE 115-*d* may assist in interference mitigation by recognizing the collision and transmitting the NACK indication for the UE 115-*e*.

As another illustrative example, the UE 115-*d* may determine that the retransmission resources are overlapping (e.g., the transmissions 305-*a* and 305-*b* may or may not be colliding and may indicate overlapping time frequency resources for respective retransmissions). In such examples, the UE 115-*d* may indicate to one or more of the UEs 115 to orthogonalize reference signals. For example, the UE 115-*d* may transmit a first interference mitigation signal to the UE 115-*f*. The first interference mitigation signal may include an indication to orthogonalize one or more reference signals and a NAK indication. For example, the signal may include a first bit indicating that the data of the transmission 305-*a* was unsuccessfully received and one or more other bits indicating to orthogonalize one or more reference signals or the IMR (e.g., the other bits may indicate a reference signal configuration to use that is orthogonal to the initial reference signal configuration used for the transmission 305-*a*). Additionally or alternatively, the UE 115-*d* may transmit a second interference mitigation signal to the UE 115-*g*. The second interference mitigation signal may include a NAK indication (e.g., the second interference mitigation signal may indicate a decoding failure by may not imply orthogonalization).

Accordingly, the UE 115-*f* may receive the first interference mitigation signal and retransmit the transmission 305-*a* using orthogonalized reference signals or IMR. In some examples, the UE 115-*f* may be unaware of whether the first interference mitigation signal was sent from the UE 115-*e* or the UE 115-*d*. The UE 115-*g* may receive the second interference mitigation signal and retransmit the transmission 305-*b* using the same reference signal or IMR configuration. Such retransmissions based on the NAK indications and/or the orthogonalization requests may enable the UE 115-*e* to successfully receive the retransmissions (e.g., due to the orthogonal reference signals of the retransmissions).

As yet another illustrative example, the UE 115-*d* may determine that a future reservation may collide. For example, the UE 115-*f* and the UE 115-*g* may have each reserved overlapping time frequency resources for future transmissions but may be unaware of such reservations (e.g., due to poor channel conditions, blocked transmissions 305-*a* and 305-*b*, etc.). Additionally or alternatively, the UE 115-*d* may determine that the future reservations have non-orthogonal reference signals (e.g., based on decoding the transmission 305-*a* and the transmission 305-*b*). In such examples, the UE 115-*d* may store the reference signal information received via the sidelink control information for each reservation (e.g., the transmission 305-*a* and the transmission 305-*b*). The UE 115-*d* may send feedback to the UE 115 making the latest (e.g., relatively more recent) reservation. For example, the UE 115-*f* may reserve, via the transmission 305-*a* at slot 7, resources occurring at slot 30. The UE 115-*g* may also reserve the resources occurring at the slot 30 via a transmission 305-*b* at slot 5. In such an example, the UE 115-*d* may transmit feedback (e.g., an indication of the collision) to the UE 115-*f*. For instance, the UE 115-*d* may transmit an interference mitigation signal to the UE 115-*f*. The interference mitigation signal, in this case, may include an orthogonalization request and may not include a NAK. Accordingly, the signal may indicate to orthogonalize one or more reference signals but may not trigger a retransmission.

In some examples, the UE 115-*d* may transmit, and other UEs 115 may receive, an interference mitigation signal over a physical sidelink feedback channel (PSFCH). For example, the UE 115-*d* may transmit a NAK indication, the indication to orthogonalize one or more reference signals, or both via the PSFCH. Additionally or alternatively, the UE 115-*d* may send the interference mitigation signal over a separate dedicated channel. For example, a separate channel may be used for inter-UE co-ordination and other enhancements, and the UEs 115 may monitor for orthogonalization requests via the dedicated channel.

Figure 4:
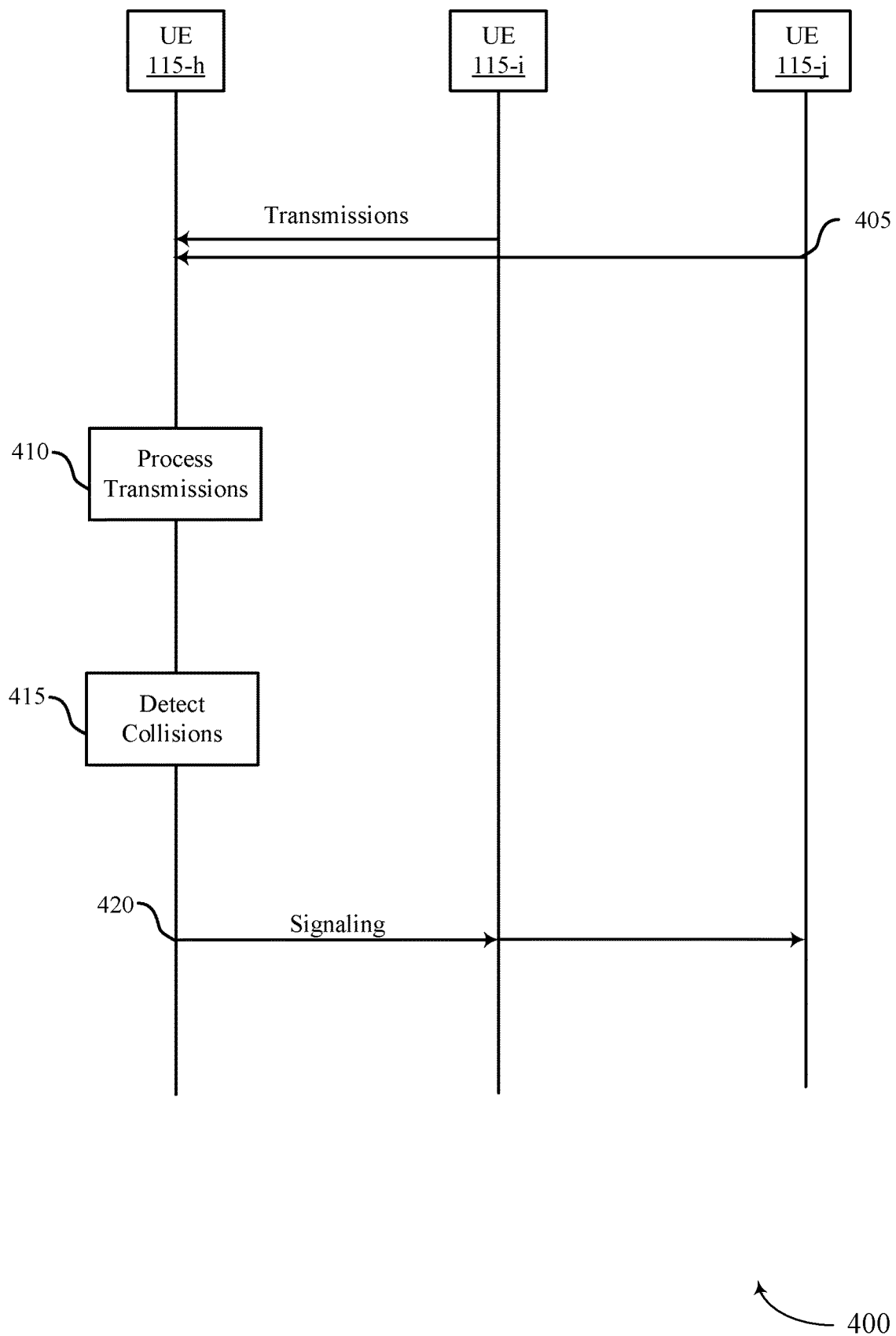
FIG. 4 illustrates an example of a process flow that supports aided reception techniques for sidelink communications systems in accordance with aspects of the present disclosure.

FIG. 4 illustrates an example of a process flow 400 that supports aided reception techniques for sidelink communications systems in accordance with aspects of the present disclosure. In some examples, the process flow 400 may implement aspects of wireless communications systems 100, 200, or 300. For example, the process flow 400 may illustrate a UE 115-*g* performing interference management operations for a UE 115-*i* and a UE 115-*j*, as described with reference to FIGS. 1-3.

The process flow 400 may include the UE 115-*h*, the UE 115-*i*, and the UE 115-*j*, which may be examples of corresponding devices as described herein. In some examples, the UE 115-*h* may be an example of or include aspects of a multi-TRP UE 115. In some aspects, the UEs 115 illustrated in FIG. 4 may communicate with one another via sidelink communications links. In some examples, the operations illustrated in process flow 400 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 405, the UE 115-*j* and the UE 115-*i* may transmit a first transmission and a second transmission, respectively. For example, the UE 115-*j* and the UE 115-*i* may send resource reservations or other communications via a sidelink. In some examples, the transmissions may not be intended for the UE 115-*h*, as described with reference to FIG. 3 (e.g., the UE 115-*h* may be in a different group than the UE 115-*i* and the UE 115-*j*).

At 410, the UE 115-*h* may process the transmissions. For example, the UE 115-*h* may receive the first transmission using a first TRP, the second transmission using a second TRP, or a combination thereof, as described herein with reference to FIGS. 2 and 3.

At 415, the UE 115-*h* may detect one or more possible collisions (e.g., interference events). For example, the UE 115-*h* may detect that the first transmission and the second transmission may be interfering with each other (e.g., the transmissions are transmitted on overlapping time-frequency resources, the transmissions use non-orthogonal reference signals, or both). Additionally or alternatively, the UE 115-*h* may detect that future transmissions may interfere with each other based on receiving the first transmission and the second transmission. For example, the first transmission may indicate resources and/or control information for a third transmission, and the second transmission may indicate resources and/or control information for a fourth transmission. The UE 115-*h* may determine that the third and fourth transmissions have overlapping resources, non-orthogonal reference signals, or both.

At 420, the UE 115-*h* may transmit signaling based on detecting the one or more possible collisions. For example, the UE 115-*h* may transmit a first interference mitigation signal to the UE 115-*i*, a second interference mitigation signal to the UE 115-*j*, or both. The interference mitigation signals may include a NAK indication, an indication to orthogonalize one or more reference signals for subsequent communications, or both. In some examples, the UE 115-*h* may transmit such signaling via a PSFCH. Additionally or alternatively, the UE 115-*h* may transmit the signaling via a dedicated channel. The UE 115-*i* and the UE 115-*j* may communicate in accordance with the received signals, as described with reference to FIG. 3.

Figure 5:
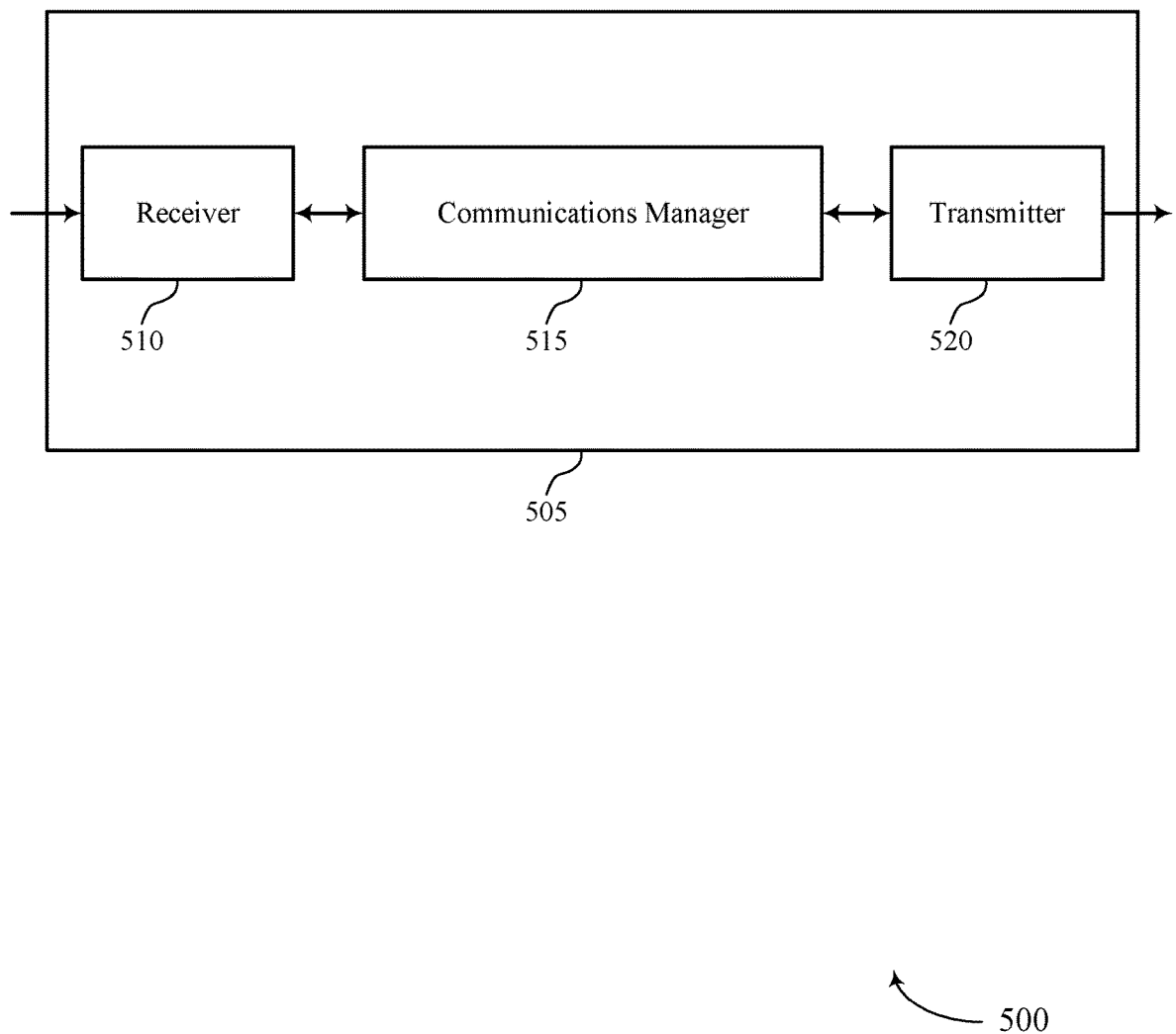
FIGS. 5 and 6 show block diagrams of devices that support aided reception techniques for sidelink communications systems in accordance with aspects of the present disclosure.

FIG. 5 shows a block diagram 500 of a device 505 that supports aided reception techniques for sidelink communications systems in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to aided reception techniques for sidelink communications systems, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive, at a first transmission reception point of the first UE, a first transmission from a second UE, the first transmission from the second UE associated with sidelink communications between the second UE and a third UE, receive a second transmission at a second transmission reception point of the first UE, identify transmissions having overlapping time-frequency resources based on receiving the first transmission and the second transmission, and transmit, to the second UE, an interference mitigation signal associated with the identified transmissions having the overlapping time-frequency resources. The communications manager 515 may also transmit a first transmission to a second UE, the first transmission associated with sidelink communications between the first UE and the second UE, where the first transmission includes a first reference signal, transmit, to the second UE, the second transmission having the orthogonalized second reference signal based on the received indication, and receive, based on transmitting the first transmission, an interference mitigation signal including an indication to orthogonalize a second reference signal of a second transmission. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The communications manager 515 as described herein may be implemented to realize one or more potential advantages. One implementation may allow the device 505 to communicate interference mitigation signals. Such operations may provide improvements to reliability and efficiency in communications for a wireless communications system. For example, the device 505 may transmit or receive an indication to orthogonalize one or more reference signals, which may enable devices in the system to avoid interference with other communications using overlapping resources. As such, supported techniques may include improved network and UE operations and, in some examples, may promote network efficiencies, reduce latency, and provide reliable communications, among other benefits The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
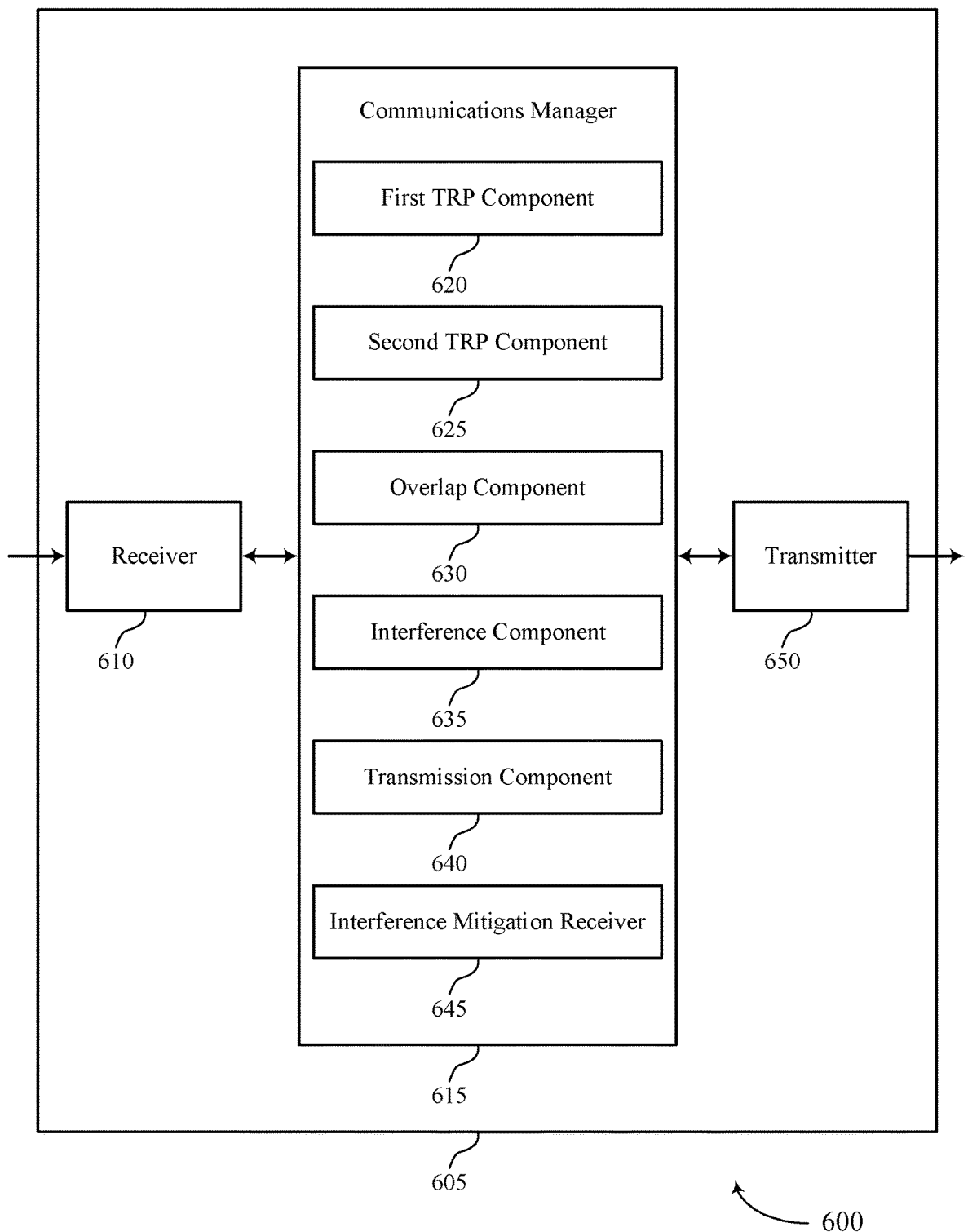

FIG. 6 shows a block diagram 600 of a device 605 that supports aided reception techniques for sidelink communications systems in accordance with aspects of the present disclosure. The device 605 may be an example of aspects of a device 505, or a UE 115 as described herein. The device 605 may include a receiver 610, a communications manager 615, and a transmitter 650. The device 605 may also include a processor. Each of these components may be in communication with one another (e.g., via one or more buses).

The receiver 610 may receive information such as packets, user data, or control information associated with various information channels (e.g., control channels, data channels, and information related to aided reception techniques for sidelink communications systems, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a first TRP component 620, a second TRP component 625, an overlap component 630, an interference component 635, a transmission component 640, and an interference mitigation receiver 645. The communications manager 615 may be an example of aspects of the communications manager 810 described herein.

The first TRP component 620 may receive, at a first transmission reception point of the first UE, a first transmission from a second UE, the first transmission from the second UE associated with sidelink communications between the second UE and a third UE.

The second TRP component 625 may receive a second transmission at a second transmission reception point of the first UE.

The overlap component 630 may identify transmissions having overlapping time-frequency resources based on receiving the first transmission and the second transmission.

The interference component 635 may transmit, to the second UE, an interference mitigation signal associated with the identified transmissions having the overlapping time-frequency resources.

The transmission component 640 may transmit a first transmission to a second UE, the first transmission associated with sidelink communications between the first UE and the second UE, where the first transmission includes a first reference signal and transmit, to the second UE, the second transmission having the orthogonalized second reference signal based on the received indication.

The interference mitigation receiver 645 may receive, based on transmitting the first transmission, an interference mitigation signal including an indication to orthogonalize a second reference signal of a second transmission.

The transmitter 650 may transmit signals generated by other components of the device 605. In some examples, the transmitter 650 may be collocated with a receiver 610 in a transceiver module. For example, the transmitter 650 may be an example of aspects of the transceiver 820 described with reference to FIG. 8. The transmitter 650 may utilize a single antenna or a set of antennas.

Figure 7:
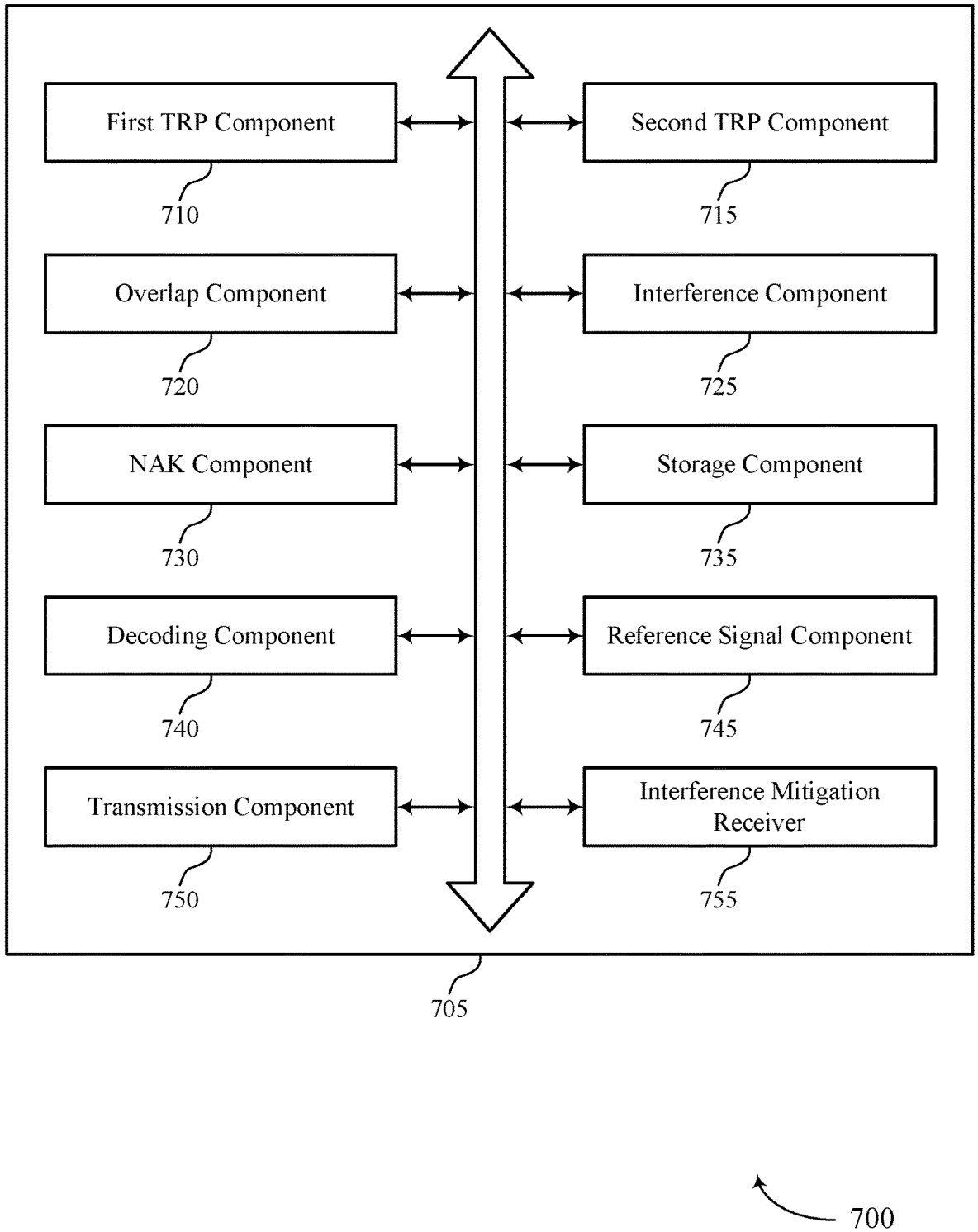
FIG. 7 shows a block diagram of a communications manager that supports aided reception techniques for sidelink communications systems in accordance with aspects of the present disclosure.

FIG. 7 shows a block diagram 700 of a communications manager 705 that supports aided reception techniques for sidelink communications systems in accordance with aspects of the present disclosure. The communications manager 705 may be an example of aspects of a communications manager 515, a communications manager 615, or a communications manager 810 described herein. The communications manager 705 may include a first TRP component 710, a second TRP component 715, an overlap component 720, an interference component 725, a NAK component 730, a storage component 735, a decoding component 740, a reference signal component 745, a transmission component 750, and an interference mitigation receiver 755. Each of these modules may communicate, directly or indirectly, with one another (e.g., via one or more buses).

The first TRP component 710 may receive, at a first transmission reception point of the first UE, a first transmission from a second UE, the first transmission from the second UE associated with sidelink communications between the second UE and a third UE.

The second TRP component 715 may receive a second transmission at a second transmission reception point of the first UE.

The overlap component 720 may identify transmissions having overlapping time-frequency resources based on receiving the first transmission and the second transmission. In some examples, the overlap component 720 may identify a third transmission indicated by the first transmission and a fourth transmission indicated by the second transmission, where the identified transmissions having overlapping time-frequency resources include the third transmission and the fourth transmission. In some cases, the identified transmissions having overlapping time-frequency resources include a third transmission indicated by the first transmission and a fourth transmission indicated by the second transmission. In some cases, the first transmission indicates a third transmission with a first set of time-frequency resources different from a second set of time-frequency resources for a fourth transmission indicated by the second transmission. In some cases, the first transmission was received subsequent to the second transmission, and where transmitting the interference mitigation signal to the second UE is based on the first transmission being received subsequent to the second transmission.

In some cases, the identified transmissions having overlapping time-frequency resources include the first transmission and the second transmission. In some cases, the identified transmissions having overlapping time-frequency resources include a third transmission indicated by the first transmission and a fourth transmission indicated by the second transmission.

The interference component 725 may transmit, to the second UE, an interference mitigation signal associated with the identified transmissions having the overlapping time-frequency resources. In some examples, the interference component 725 may transmit an indication to orthogonalize one or more reference signals for the sidelink communications between the second UE and the third UE.

In some examples, the interference component 725 may transmit a negative acknowledgment indication and an indication to orthogonalize one or more reference signals for the sidelink communications between the second UE and the third UE. In some examples, the interference component 725 may transmit the interference mitigation signal via a physical sidelink feedback channel. In some examples, the interference component 725 may transmit the interference mitigation signal via a dedicated channel. In some cases, the interference mitigation signal includes a first bit for the negative acknowledgment indication and one or more bits for the indication to orthogonalize one or more reference signals.

The transmission component 750 may transmit a first transmission to a second UE, the first transmission associated with sidelink communications between the first UE and the second UE, where the first transmission includes a first reference signal.

In some examples, the transmission component 750 may transmit, to the second UE, the second transmission having the orthogonalized second reference signal based on the received indication.

The interference mitigation receiver 755 may receive, based on transmitting the first transmission, an interference mitigation signal including an indication to orthogonalize a second reference signal of a second transmission. In some examples, the interference mitigation receiver 755 may receive a negative acknowledgment indication. In some examples, the interference mitigation receiver 755 may receive the interference mitigation signal via a physical sidelink feedback channel. In some examples, the interference mitigation receiver 755 may receive the interference mitigation signal via a dedicated channel. In some cases, the interference mitigation signal includes a first bit for the negative acknowledgment indication and one or more bits for the indication to orthogonalize the second reference signal. In some cases, the first reference signal, the second reference signal, or both include demodulation reference signal sequences, channel state information reference signal sequences, interference management resource signals, or any combination thereof.

The NAK component 730 may transmit, to one or more UEs associated with the identified transmissions having overlapping time-frequency resources, a second interference mitigation signal that includes a negative acknowledgment indication. In some examples, the NAK component 730 may transmit a negative acknowledgment indication.

The storage component 735 may store reference signal information associated with the first transmission and the second transmission.

The decoding component 740 may decode the first transmission and the second transmission.

The reference signal component 745 may determine that the identified transmissions having overlapping time-frequency resources are associated with non-orthogonal reference signals based on the decoding, where transmitting the interference mitigation signal is based on the transmissions being associated with the non-orthogonal reference signals. In some cases, the non-orthogonal reference signals include demodulation reference signal sequences, channel state information reference signal sequences, interference management resource signals, or any combination thereof.

Figure 8:
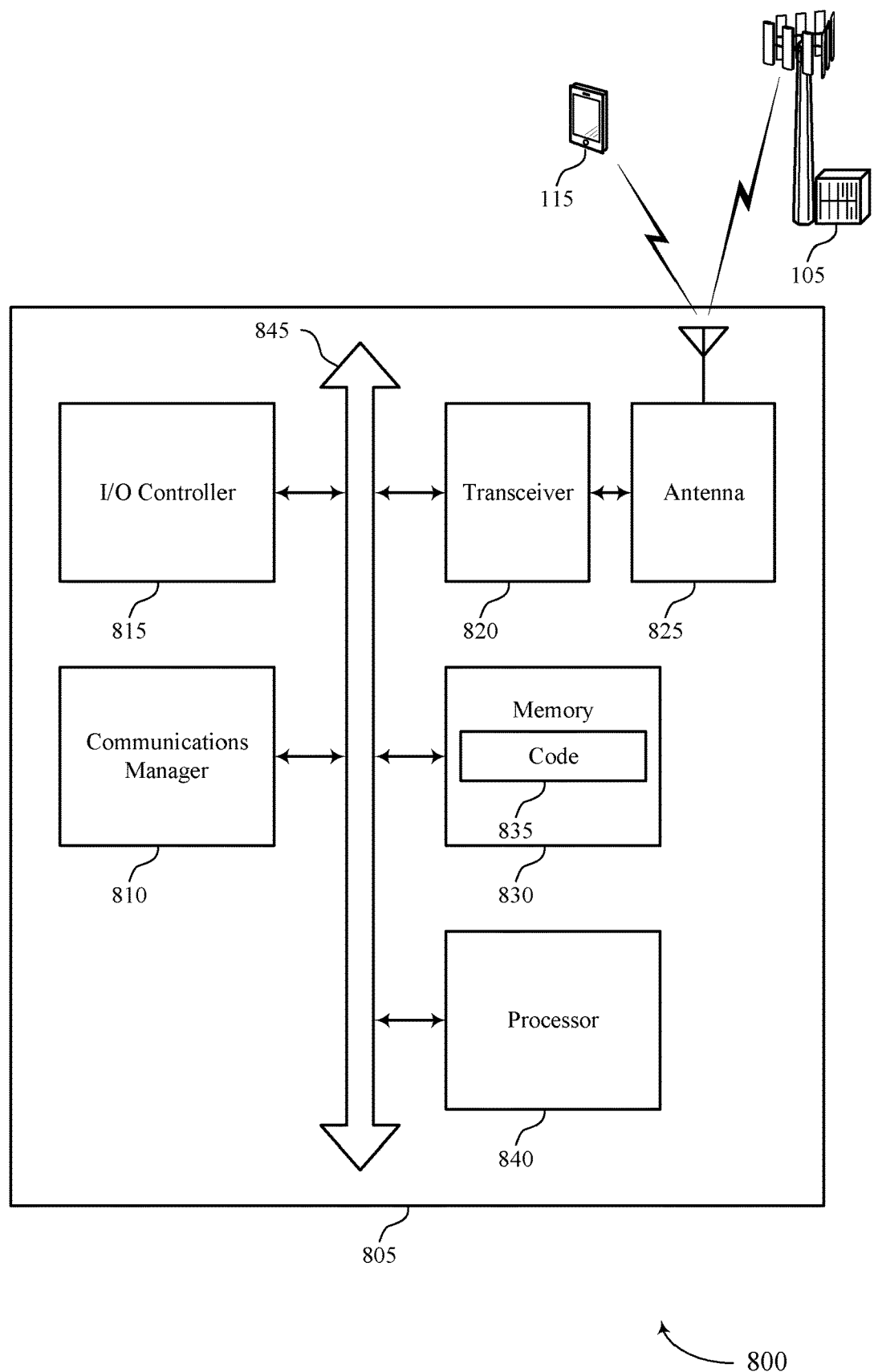
FIG. 8 shows a diagram of a system including a device that supports aided reception techniques for sidelink communications systems in accordance with aspects of the present disclosure.

FIG. 8 shows a diagram of a system 800 including a device 805 that supports aided reception techniques for sidelink communications systems in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive, at a first transmission reception point of the first UE, a first transmission from a second UE, the first transmission from the second UE associated with sidelink communications between the second UE and a third UE, receive a second transmission at a second transmission reception point of the first UE, identify transmissions having overlapping time-frequency resources based on receiving the first transmission and the second transmission, and transmit, to the second UE, an interference mitigation signal associated with the identified transmissions having the overlapping time-frequency resources. The communications manager 810 may also transmit a first transmission to a second UE, the first transmission associated with sidelink communications between the first UE and the second UE, where the first transmission includes a first reference signal, transmit, to the second UE, the second transmission having the orthogonalized second reference signal based on the received indication, and receive, based on transmitting the first transmission, an interference mitigation signal including an indication to orthogonalize a second reference signal of a second transmission.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting aided reception techniques for sidelink communications systems).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
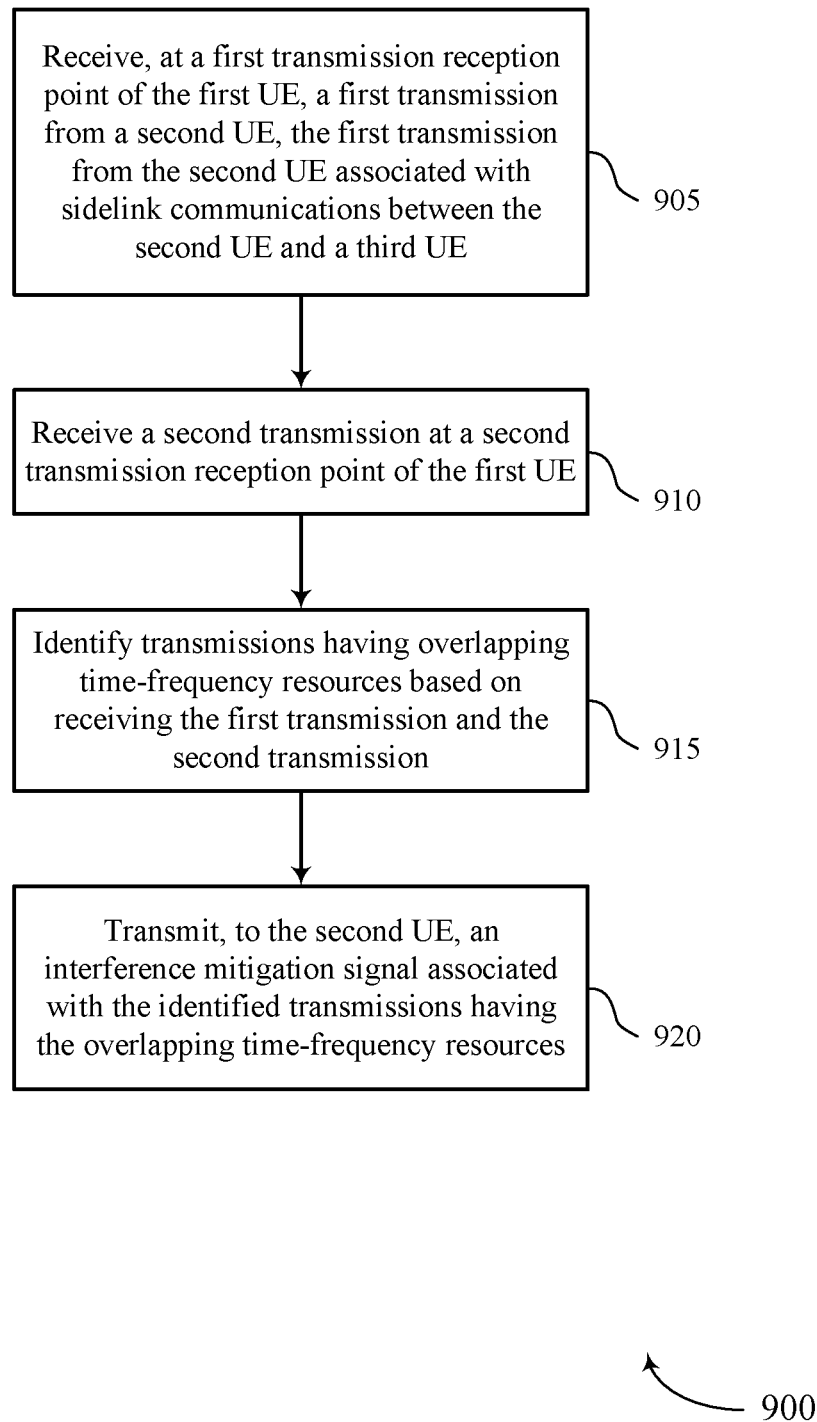
FIGS. 9 through 11 show flowcharts illustrating methods that support aided reception techniques for sidelink communications systems in accordance with aspects of the present disclosure.

FIG. 9 shows a flowchart illustrating a method 900 that supports aided reception techniques for sidelink communications systems in accordance with aspects of the present disclosure. The operations of method 900 may be implemented by a UE 115 or its components as described herein. For example, the operations of method 900 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 905, the UE may receive, at a first transmission reception point of the first UE, a first transmission from a second UE, the first transmission from the second UE associated with sidelink communications between the second UE and a third UE. The operations of 905 may be performed according to the methods described herein. In some examples, aspects of the operations of 905 may be performed by a first TRP component as described with reference to FIGS. 5 through 8.

At 910, the UE may receive a second transmission at a second transmission reception point of the first UE. The operations of 910 may be performed according to the methods described herein. In some examples, aspects of the operations of 910 may be performed by a second TRP component as described with reference to FIGS. 5 through 8.

At 915, the UE may identify transmissions having overlapping time-frequency resources based on receiving the first transmission and the second transmission. The operations of 915 may be performed according to the methods described herein. In some examples, aspects of the operations of 915 may be performed by an overlap component as described with reference to FIGS. 5 through 8.

At 920, the UE may transmit, to the second UE, an interference mitigation signal associated with the identified transmissions having the overlapping time-frequency resources. The operations of 920 may be performed according to the methods described herein. In some examples, aspects of the operations of 920 may be performed by an interference component as described with reference to FIGS. 5 through 8.

Figure 10:
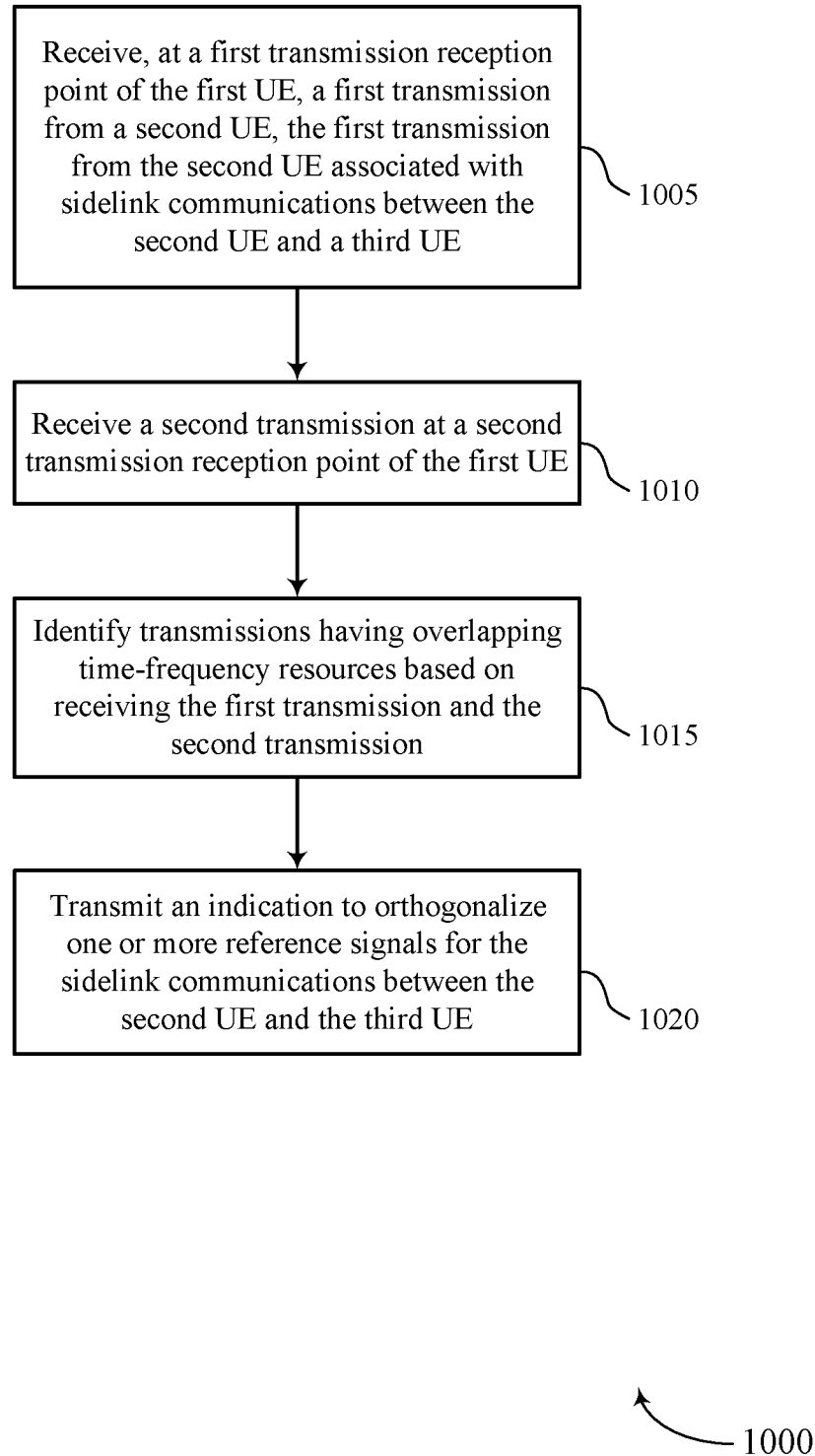

FIG. 10 shows a flowchart illustrating a method 1000 that supports aided reception techniques for sidelink communications systems in accordance with aspects of the present disclosure. The operations of method 1000 may be implemented by a UE 115 or its components as described herein. For example, the operations of method 1000 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1005, the UE may receive, at a first transmission reception point of the first UE, a first transmission from a second UE, the first transmission from the second UE associated with sidelink communications between the second UE and a third UE. The operations of 1005 may be performed according to the methods described herein. In some examples, aspects of the operations of 1005 may be performed by a first TRP component as described with reference to FIGS. 5 through 8.

At 1010, the UE may receive a second transmission at a second transmission reception point of the first UE. The operations of 1010 may be performed according to the methods described herein. In some examples, aspects of the operations of 1010 may be performed by a second TRP component as described with reference to FIGS. 5 through 8.

At 1015, the UE may identify transmissions having overlapping time-frequency resources based on receiving the first transmission and the second transmission. The operations of 1015 may be performed according to the methods described herein. In some examples, aspects of the operations of 1015 may be performed by an overlap component as described with reference to FIGS. 5 through 8.

At 1020, the UE may transmit, to the second UE, an interference mitigation signal associated with the identified transmissions having the overlapping time-frequency resources. For example, the UE may transmit an indication to orthogonalize one or more reference signals for the sidelink communications between the second UE and the third UE. The operations of 1020 may be performed according to the methods described herein. In some examples, aspects of the operations of 1020 may be performed by an interference component as described with reference to FIGS. 5 through 8.

Figure 11:
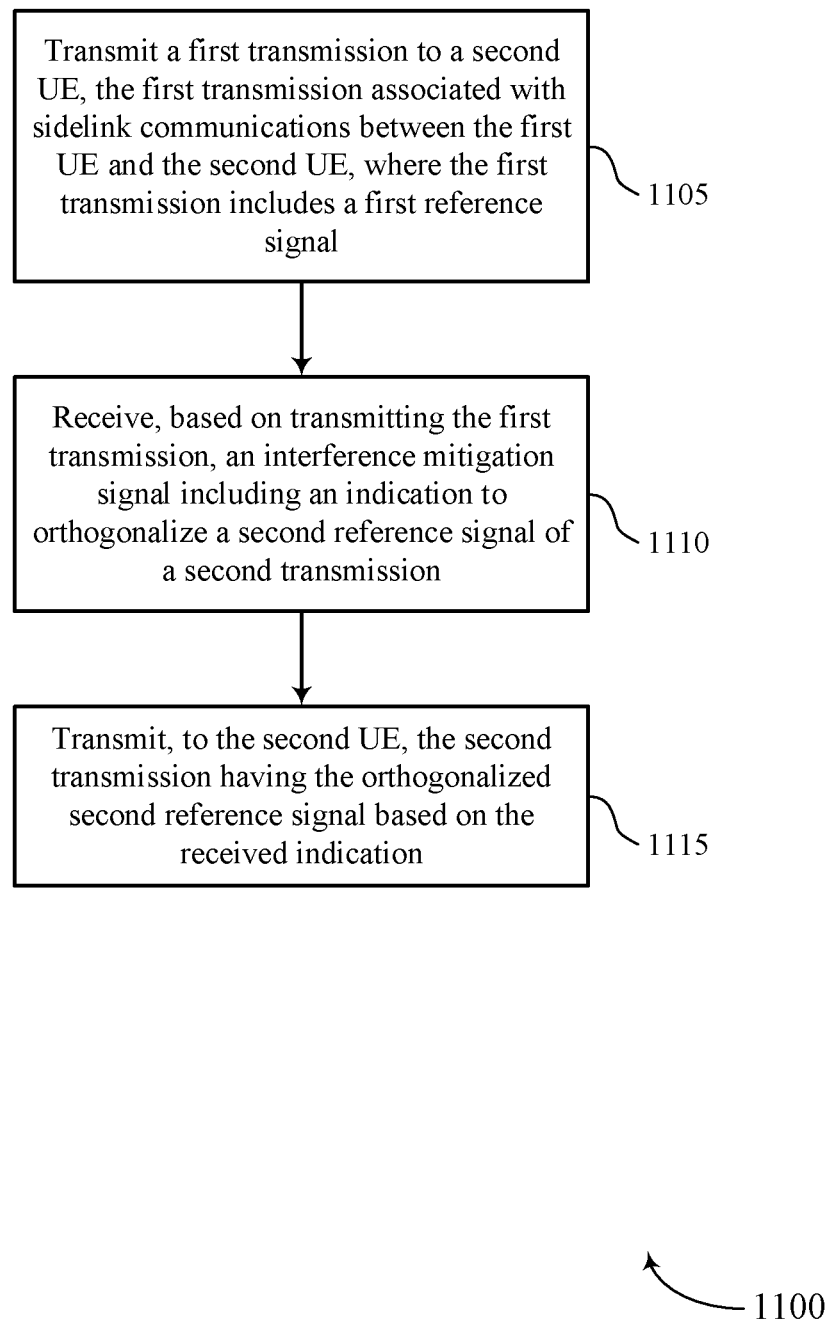

FIG. 11 shows a flowchart illustrating a method 1100 that supports aided reception techniques for sidelink communications systems in accordance with aspects of the present disclosure. The operations of method 1100 may be implemented by a UE 115 or its components as described herein. For example, the operations of method 1100 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1105, the UE may transmit a first transmission to a second UE, the first transmission associated with sidelink communications between the first UE and the second UE, where the first transmission includes a first reference signal. The operations of 1105 may be performed according to the methods described herein. In some examples, aspects of the operations of 1105 may be performed by a transmission component as described with reference to FIGS. 5 through 8.

At 1110, the UE may receive, based on transmitting the first transmission, an interference mitigation signal including an indication to orthogonalize a second reference signal of a second transmission. The operations of 1110 may be performed according to the methods described herein. In some examples, aspects of the operations of 1110 may be performed by an interference mitigation receiver as described with reference to FIGS. 5 through 8.

At 1115, the UE may transmit, to the second UE, the second transmission having the orthogonalized second reference signal based on the received indication. The operations of 1115 may be performed according to the methods described herein. In some examples, aspects of the operations of 1115 may be performed by a transmission component as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first user equipment (UE), comprising:
   receiving, at a first transmission reception point of the first UE, a first transmission from a second UE, the first transmission from the second UE associated with sidelink communications between the second UE and a third UE;
   receiving a second transmission at a second transmission reception point of the first UE;
   identifying transmissions having overlapping time-frequency resources based at least in part on receiving the first transmission and the second transmission; and
   transmitting, to the second UE, an interference mitigation signal associated with the identified transmissions having the overlapping time-frequency resources.

2. The method of claim 1, wherein transmitting the interference mitigation signal comprises:
   transmitting an indication to orthogonalize one or more reference signals for the sidelink communications between the second UE and the third UE.

3. The method of claim 1, wherein transmitting the interference mitigation signal comprises:
   transmitting a negative acknowledgment indication and an indication to orthogonalize one or more reference signals for the sidelink communications between the second UE and the third UE.

4. The method of claim 3, further comprising:
   transmitting, to one or more UEs associated with the identified transmissions having overlapping time-frequency resources, a second interference mitigation signal that comprises a second negative acknowledgment indication.

5. The method of claim 3, wherein the identified transmissions having overlapping time-frequency resources comprise a third transmission indicated by the first transmission and a fourth transmission indicated by the second transmission.

6. The method of claim 3, wherein the interference mitigation signal comprises a first bit for the negative acknowledgment indication and one or more bits for the indication to orthogonalize one or more reference signals.

7. The method of claim 1, wherein transmitting the interference mitigation signal comprises:
   transmitting a negative acknowledgment indication.

8. The method of claim 7, wherein the first transmission indicates a third transmission with a first set of time-frequency resources different from a second set of time-frequency resources for a fourth transmission indicated by the second transmission.

9. The method of claim 1, further comprising:
   storing reference signal information associated with the first transmission and the second transmission; and
   identifying a third transmission indicated by the first transmission and a fourth transmission indicated by the second transmission, wherein the identified transmissions having overlapping time-frequency resources include the third transmission and the fourth transmission.

10. The method of claim 9, wherein the first transmission was received subsequent to the second transmission, and wherein transmitting the interference mitigation signal to the second UE is based at least in part on the first transmission being received subsequent to the second transmission.

11. The method of claim 1, further comprising:
    transmitting the interference mitigation signal via a physical sidelink feedback channel.

12. The method of claim 1, further comprising:
    transmitting the interference mitigation signal via a dedicated channel.

13. The method of claim 1, further comprising:
    decoding the first transmission and the second transmission; and
    determining that the identified transmissions having overlapping time-frequency resources are associated with non-orthogonal reference signals based at least in part on the decoding, wherein transmitting the interference mitigation signal is based at least in part on the transmissions being associated with the non-orthogonal reference signals.

14. The method of claim 13, wherein the non-orthogonal reference signals comprise demodulation reference signal sequences, channel state information reference signal sequences, interference management resource signals, or any combination thereof.

15. The method of claim 1, wherein the identified transmissions having overlapping time-frequency resources include the first transmission and the second transmission.

16. The method of claim 1, wherein the identified transmissions having overlapping time-frequency resources include a third transmission indicated by the first transmission and a fourth transmission indicated by the second transmission.

17. A method for wireless communications at a first user equipment (UE), comprising:

transmitting a first transmission to a second UE, the first transmission associated with sidelink communications between the first UE and the second UE, wherein the first transmission comprises a first reference signal;

receiving, based at least in part on transmitting the first transmission, an interference mitigation signal comprising an indication to orthogonalize a second reference signal of a second transmission; and transmitting, to the second UE, the second transmission having the orthogonalized second reference signal based at least in part on the received indication.

18. The method of claim 17, wherein receiving the interference mitigation signal comprises:
receiving a negative acknowledgment indication.

19. The method of claim 18, wherein the interference mitigation signal comprises a first bit for the negative acknowledgment indication and one or more bits for the indication to orthogonalize the second reference signal.

20. The method of claim 17, further comprising:
receiving the interference mitigation signal via a physical sidelink feedback channel.

21. The method of claim 17, further comprising:
receiving the interference mitigation signal via a dedicated channel.

22. The method of claim 17, wherein the first reference signal, the second reference signal, or both comprise demodulation reference signal sequences, channel state information reference signal sequences, interference management resource signals, or any combination thereof.

23. An apparatus for wireless communications at a first user equipment (UE), comprising:
a processor,
memory coupled with the processor; and
instructions stored in the memory and executable by the processor to cause the apparatus to:
receive, at a first transmission reception point of the first UE, a first transmission from a second UE, the first transmission from the second UE associated with sidelink communications between the second UE and a third UE;
receive a second transmission at a second transmission reception point of the first UE;
identify transmissions having overlapping time-frequency resources based at least in part on receiving the first transmission and the second transmission; and
transmit, to the second UE, an interference mitigation signal associated with the identified transmissions having the overlapping time-frequency resources.

24. The apparatus of claim 23, wherein the instructions to transmit the interference mitigation signal are executable by the processor to cause the apparatus to:
transmit an indication to orthogonalize one or more reference signals for the sidelink communications between the second UE and the third UE.

25. The apparatus of claim 23, wherein the instructions to transmit the interference mitigation signal are executable by the processor to cause the apparatus to:
transmit a negative acknowledgment indication and an indication to orthogonalize one or more reference signals for the sidelink communications between the second UE and the third UE.

26. The apparatus of claim 25, wherein the instructions are further executable by the processor to cause the apparatus to:
transmit, to one or more UEs associated with the identified transmissions having overlapping time-frequency resources, a second interference mitigation signal that comprises a second negative acknowledgment indication.

27. The apparatus of claim 25, wherein the identified transmissions having overlapping time-frequency resources comprise a third transmission indicated by the first transmission and a fourth transmission indicated by the second transmission.

28. The apparatus of claim 25, wherein the interference mitigation signal comprises a first bit for the negative acknowledgment indication and one or more bits for the indication to orthogonalize one or more reference signals.

29. The apparatus of claim 23, wherein the instructions to transmit the interference mitigation signal are executable by the processor to cause the apparatus to:
transmit a negative acknowledgment indication.

30. The apparatus of claim 29, wherein the first transmission indicates a third transmission with a first set of time-frequency resources different from a second set of time-frequency resources for a fourth transmission indicated by the second transmission.

31. The apparatus of claim 23, wherein the instructions are further executable by the processor to cause the apparatus to:
store reference signal information associated with the first transmission and the second transmission; and
identify a third transmission indicated by the first transmission and a fourth transmission indicated by the second transmission, wherein the identified transmissions having overlapping time-frequency resources include the third transmission and the fourth transmission.

32. The apparatus of claim 31, wherein the first transmission was received subsequent to the second transmission, and wherein transmitting the interference mitigation signal to the second UE is based at least in part on the first transmission being received subsequent to the second transmission.

33. The apparatus of claim 23, wherein the instructions are further executable by the processor to cause the apparatus to:
decode the first transmission and the second transmission; and
determine that the identified transmissions having overlapping time-frequency resources are associated with non-orthogonal reference signals based at least in part on the decoding, wherein transmitting the interference mitigation signal is based at least in part on the transmissions being associated with the non-orthogonal reference signals.

34. An apparatus for wireless communications at a first user equipment (UE), comprising:
a processor,
memory coupled with the processor; and
instructions stored in the memory and executable by the processor to cause the apparatus to:
transmit a first transmission to a second UE, the first transmission associated with sidelink communications between the first UE and the second UE, wherein the first transmission comprises a first reference signal;
receive, based at least in part on transmitting the first transmission, an interference mitigation signal comprising an indication to orthogonalize a second reference signal of a second transmission; and transmit, to the second UE, the second transmission having the orthogonalized second reference signal based at least in part on the received indication.

35. An apparatus for wireless communications at a first user equipment (UE), comprising:
- means for receiving, at a first transmission reception point of the first UE, a first transmission from a second UE, the first transmission from the second UE associated with sidelink communications between the second UE and a third UE;
- means for receiving a second transmission at a second transmission reception point of the first UE;
- means for identifying transmissions having overlapping time-frequency resources based at least in part on receiving the first transmission and the second transmission; and
- means for transmitting, to the second UE, an interference mitigation signal associated with the identified transmissions having the overlapping time-frequency resources.

* * * * *